Patented May 21, 1929.

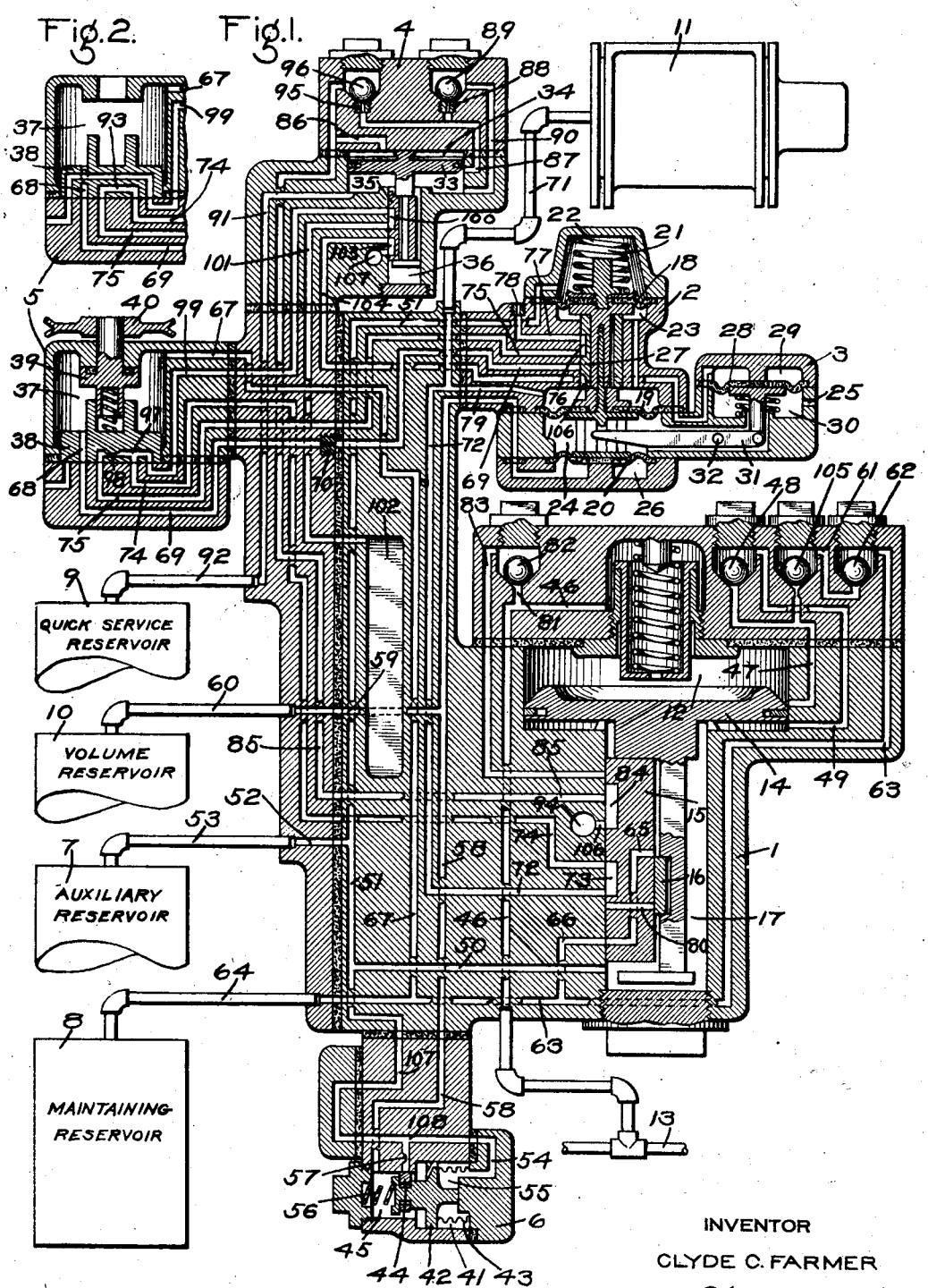

1,714,010

UNITED STATES PATENT OFFICE.

CLYDE C. FARMER, OF PITTSBURGH, PENNSYLVANIA, ASSIGNOR TO THE WESTING-HOUSE AIR BRAKE COMPANY, OF WILMERDING, PENNSYLVANIA, A CORPORATION OF PENNSYLVANIA.

FLUID-PRESSURE BRAKE.

Application filed December 10, 1926. Serial No. 153,823.

This invention relates to fluid pressure brakes and more particularly to a brake controlling device of the type having means for maintaining brake cylinder pressure against leakage, during a service application of the brakes.

In operation down a grade, with the usual standard brake equipment, a cycling method of brake control is employed, in which the brakes are alternately applied and partially released. While the brake pipe and auxiliary reservoirs are being recharged, following a service application of the brakes, fluid is slowly vented from the brake cylinder through the usual retaining valve device, thereby prolonging the time of brake release to such a degree that the brake equipments on the train become recharged sufficiently to enable the operator to make another service application before fluid in the brake cylinder has become entirely exhausted. This results in a higher than usual brake cylinder pressure for the particular reduction in brake pipe pressure, since the brake cylinder pressure obtained from said brake pipe reduction is added to the retained pressure from the previous brake application.

With a brake equipment having means for maintaining brake cylinder pressure against leakage during a service application of the brakes, as disclosed, for example, in the patent application of Clyde C. Farmer and Thomas H. Thomas, Serial No. 79,542, filed January 6, 1926, the brake cylinder pressure obtained for any brake pipe reduction always bears a definite relation to the auxiliary reservoir pressure, even if a second brake application is made prior to a complete release of fluid from the brake cylinder. Thus a cycling method of brake control on a grade, when using this equipment, will result in a brake cylinder pressure no higher than that obtained from a normal service application of the brakes.

The principal object of my invention is to provide means whereby in cycling operation, with a brake equipment of the maintaining type, a higher than usual brake cylinder pressure may be obtained for a given degree of brake pipe reduction.

Other objects and advantages will appear in the following more detailed description of the invention.

In the accompanying drawing; Fig. 1 is a diagrammatic, cross-sectional, view of a fluid pressure brake device embodying my invention; and Fig. 2 a sectional view of the change-over valve portion, shown in Fig. 1, with the rotary valve in graduated release position.

As shown in the drawing, the brake equipment may comprise a triple valve device 1, having associated therewith a maintaining valve portion 2, a balancing portion 3, a repeater valve portion 4, a release change-over valve portion 5, a check valve portion 6, an auxiliary reservoir 7, a maintaining reservoir 8, a quick service reservoir 9, a volume reservoir 10, and a brake cylinder 11.

The triple valve device 1 may comprise a casing, having a chamber 12, connected to the usual brake pipe 13, and containing a piston 14 adapted to control a main slide valve 15 and an auxiliary slide valve 16, contained in a valve chamber 17, which chamber is in constant communication with the auxiliary reservoir 7.

The maintaining valve portion 2 may comprise a casing, containing three diaphragms, 18, 19, and 20, forming a chamber 21 connected to the auxiliary reservoir 7 and containing a spring 22 acting on diaphragm 18, another chamber 23 connected to the brake cylinder 11, a third chamber 24 connected to the balancing portion 3, and thence to atmosphere through passage 25, and a fourth chamber 26 connected to the volume reservoir 10. Said diaphragms are adapted to be operated by variations in pressure in chambers 21 and 23 for controlling a slide valve 27 contained in chamber 23.

Associated with the maintaining valve portion 2 is a balancing portion 3 which may comprise a casing, containing a diaphragm 28, forming a chamber 29 at one side, which chamber is subject to variations in pressure dependent upon the operation of the repeater valve portion 4. The chamber 30 at the opposite side of the diaphragm 28 is connected to the atmosphere through port 25.

Pivotally connected to diaphragm 28 of the balancing portion 3 is a lever 31, which is fulcrumed on a pin 32. Said lever extends into chamber 24, between the diaphragms 19 and 20 of the maintaining valve portion 2, and is adapted to either contact with the diaphragm 19 and exert an upward pressure on the valve mechanism of the maintaining valve portion 2, or to merely float freely in chamber 24 under normal conditions of brake operation.

The repeater valve portion 4 may comprise a casing, containing a piston 33 having a chamber 34 at one side and adapted to operate a slide valve 35 contained in chamber 36 at the opposite side, said chamber 36 being connected to the quick service reservoir 9.

In the normal release position of the slide valve 15 of the triple valve device, the chamber 36 and consequently the quick service reservoir 9 are connected to the exhaust by way of passage 87, past check valve 96, passage 85, cavity 84 in slide valve 15 and atmospheric exhaust port 94.

The release change-over portion 5 may comprise a casing, having a chamber 37, containing a rotary valve 38, adapted to be operated by turning a key 39, by means of a wheel 40. This release change-over portion 5 may have three operating positions, namely, graduated release position, as shown in Fig. 2, cycling position, as shown in Fig. 1, and a direct release position, (not shown).

The check valve portion 6 may comprise a casing, having a chamber 41 containing a piston head 42 connected to a bellows diaphragm 43, said piston head being adapted to operate a slide valve 44 contained in valve chamber 45. The slide valve 44 is adapted to control communication through which chamber 26 of the maintaining portion 2 and the volume reservoir 10 are charged from valve chamber 17 of the triple valve device 1.

The volume reservoir 10 is added to the volume of chamber 26, so that during a service application of the brakes, after the triple valve device has moved to service lap position, the added volume of the reservoir serves to prevent any serious drop in pressure in chamber 26, through leakage from said chamber.

In operation, to charge the brake equipment, the brake pipe 13 being charged with fluid under pressure in the usual manner, fluid under pressure from the brake pipe 13 flows through passage 46 into piston chamber 12 of the triple valve device 1, thence through passage 47, past ball check valve 48 and through passage 49 into valve chamber 17, and from said chamber through passages 50, 51, and 52, and pipe 53 to the auxiliary reservoir 7, thus charging the auxiliary reservoir with fluid under pressure.

Fluid under pressure from passage 51 flows into chamber 21 of the maintaining valve portion 2 and thus charges said chamber with fluid at auxiliary reservoir pressure.

Fluid under pressure from passages 51 also flows through passages 107, 108, and 54, to chamber 55, inside of the bellows diaphragm 43 of the check valve portion 6, and acts on piston head 42, causing said head and slide valve 44 to be shifted against the pressure of spring 56, to a position in which said slide valve opens communication from passage 108, through a restricted port 57 to valve chamber 45. From chamber 45 fluid is supplied through passage 58 to chamber 26 of the maintaining valve portion 2, thus charging said chamber and the volume reservoir 10 through passage 59 and pipe 60 with fluid at auxiliary reservoir pressure.

When the chamber 26 and volume reservoir 10 are charged to substantially the same pressure as that in the auxiliary reservoir 7, spring 56 moves piston head 42 and slide valve 44 so as to cut off communication from passage 108 to valve chamber 45.

The maintaining reservoir 8 is charged with fluid under pressure from the triple valve piston chamber 12, through passage 47, past ball check valve 105, through passage 61, past ball check valve 62 and then through passage 63 and pipe 64. When piston 14 and slide valve 15, of the triple valve device, are in release position, as shown in the drawing, fluid under pressure from valve chamber 17 flows through port 65 in the main slide valve 15, and passages 66 and 63 to the maintaining reservoir 8.

Valve chamber 37 of the release change-over portion 5 is connected through passage 67 and pipe 64 to the maintaining reservoir 8, so that said chamber contains fluid at maintaining reservoir pressure.

In both graduated release and cycling positions of the release change-over valve portion 5, port 68, through the rotary valve 38, registers with passage 69, so that fluid at maintaining reservoir pressure in chamber 37 is supplied through passage 69 and a choke plug 70 to the seat of slide valve 27 of the maintaining valve portion 2.

In release position of the triple valve device 1, the brake cylinder 11 is connected to the atmosphere through pipe 71, passage 72, cavity 73 in the main slide valve 15 of the triple valve device 1, passage 74, a cavity in the rotary valve 38 of the release change over valve portion 5, with the rotary valve 38 in either graduated release or cycling position, passage 75, cavity 76 in slide valve 27 of the maintaining valve portion 2, passage 77, and choke plug 78 which opens to the atmosphere. Chamber 23 of the maintaining valve portion 2 being connected through passage 79 to passage 72, from the brake cylinder 11, is also vented to atmosphere in release position of the triple valve device 1.

A service application of the brakes is effected in the usual manner by making a gradual reduction in brake pipe pressure, which causes the triple valve device to be shifted to service position in which the service port 80, through the main slide valve 15, registers with passage 72 leading to the brake cylinder 11. Fluid at auxilary reservoir pressure in valve chamber 17 then flows through passage 72 to the brake cylinder 11 and also from passage 72 through passage 79 to chamber 23 of the maintaining valve portion 2.

Chamber 21 of the maintaining valve portion 2 being connected through passages 51 and 52 to the auxiliary reservoir 7, the pressure therein reduces with the pressure in the auxiliary reservoir 7, and thus unbalances the pressures acting on the diaphragms 18, 19, and 20, and causes said diaphragms to operate and shift the slide valve 27 to a position in which cavity 106 uncovers passage 69 in the slide valve seat so that fluid at maintaining reservoir pressure from passage 69, flows into valve chamber 23, and through passages 79 and 72 and pipe 71 to the brake cylinder 11, thus applying the brakes with fluid supplied from the maintaining reservoir, as well as the fluid supplied from the auxiliary reservoir by operation of the triple valve device.

In service position of the triple valve device 1, fluid from the brake pipe 13 flows through passage 46, through passage 81, past ball check valve 82, through passage 83, cavity 84 in the main slide valve 15 of the triple valve device 1, passage 85 and passage 86 into chamber 34, at one side of piston 33 of the repeater valve portion 4. Said piston is thereby shifted so as to open passage 87 to chamber 34, above piston 33, so that fluid from the brake pipe flows through passage 87, choke plug 88, past the ball check valve 89 and through the passage 90 to the opposite side of the piston 33, and thence through passage 91 and pipe 92 to the quick service reservoir 9. Fluid from the brake pipe thus vented to reservoir 9 causes a quick local drop in brake pipe pressure, thus causing a quick serial action of the triple valve devices throughout the train.

When the auxilary reservoir pressure in valve chamber 17 of the triple valve device 1 has been reduced to a degree slightly less than the reduced brake pipe pressure, the triple valve device is shifted to service lap position, in the usual manner, in which position communication from the auxiliary reservoir and valve chamber 17 to the brake cylinder 11 is cut off.

With the triple valve device in service lap position, fluid under pressure continues to flow from the maintaining reservoir 8 to chamber 23 of the maintaining valve device 2 and to the brake cylinder 11, until the pressure in chamber 23 is increased sufficiently to shift the diaphragms 18, 19, and 20 so as to move the slide valve 27 to lap passage 64 and prevent a further flow of fluid from the maintaining reservoir to the brake cylinder. In this position of the slide valve 27, communication between passages 75 and 77, through cavity 76, is also cut off.

If with the brakes applied and with the triple valve device in service lap position, leakage occurs from the brake cylinder 11 to the atmosphere, the pressure in chamber 23 of the maintaining valve portion 2 also reduces with the brake cylinder pressure and thereby unbalances the pressures acting on the diaphragms 18, 19, and 20, causing said diaphragms to move and shift the slide valve 27 so as to connect passage 69 from the maintaining reservoir 8 to chamber 23 and to the brake cylinder 11. Fluid at maintaining reservoir pressure then flows into chamber 23 and to the brake cylinder 11 and increases the pressure therein. When the pressure in the brake cylinder is restored to the original degree, the corresponding increase in pressure in chamber 23 restores the balance of pressures on the diaphragms 18, 19, and 20, and causes said diaphragms to be shifted so that slide valve 27 is moved to the position in which communication between the maintaining reservoir 8 and the brake cylinder 11 is again cut off.

With the triple valve device in service lap position, the maintaining valve device 2 functions to maintain brake cylinder pressure against leakage, as above described, until the maintaining reservoir pressure becomes reduced to the pressure in the auxiliary reservoir 7 and valve chamber 17 of the triple valve device 1. Further flow of fluid from the maintaining reservoir to the brake cylinder tends to reduce the maintaining reservoir pressure below the auxiliary reservoir pressure, but this is prevented, since fluid from the auxiliary reservoir is free to flow from the valve chamber 17 through passage 47, past ball check valve 105, through passage 61, past ball check valve 62 and through passage 63 to the maintaining reservoir 8, so that the pressure in the auxiliary reservoir falls with that in the maintaining reservoir.

The flow of fluid from the auxiliary reservoir 7 and valve chamber 17 to the maintaining reservoir causes a decrease in the auxiliary reservoir pressure, which permits the higher brake pipe pressure to shift the triple valve device to release position, in which the brake pipe 13 and piston chamber 12 are connected to the maintaining reservoir 8 and to the auxiliary reservoir 7, so that the pressures in said reservoirs is maintained by flow from the brake pipe 13. Chamber 21 of the maintaining valve portion 2, being connected to the auxiliary reservoir 7 is thus supplied with fluid from the brake pipe so that the degree of brake cylinder pressure is thus directly controlled according to the degree of pressure in the brake pipe. It will thus be evident that any further leakage of fluid from the brake cylinder will be compensated for by flow of fluid from the brake pipe.

If it is desired to graduate the release of the brakes, the release change-over portion 5 is turned to graduated release position, as shown in Fig. 2, and the brake pipe pressure is then gradually increased to cause movement of the triple valve device to release position, in which position the maintaining reservoir is connected to the auxiliary reservoir through pipe 64, passages 63 and 66, and port 65 through the main slide valve 15 of the triple valve device, to valve chamber 17, which is in constant communication with the auxiliary reservoir 7. The flow of fluid under pressure to the auxiliary reservoir causes a corresponding increase in pressure in chamber 21 of the maintaining valve portion 2, which unbalances the pressures acting on the diaphragms 18, 19, and 20, so that said diaphragms are shifted and move the slide valve 27 to a position in which cavity 76 connects passage 75 from the brake cylinder, to passage 77 and the choked plug 78, so that fluid is vented from the brake cylinder to the atmosphere.

When the pressure in the auxiliary reservoir has been increased by flow from the maintaining reservoir to a degree slightly in excess of the pressure in the brake pipe, the piston 14 is moved to graduated release lap position, in which position the auxiliary slide valve 16 laps the passage 65 and prevents further flow of fluid from the maintaining reservoir to the valve chamber 17.

When the brake pressure becomes reduced to a degree corresponding with the increase in auxiliary reservoir pressure, the balance of pressures on the diaphragms 18, 19, and 20, is restored and said diaphragms then operate to shift the slide valve 27 so as to lap passage 75 and prevent further venting of fluid from the brake cylinder.

The brake pressure may be further increased as desired, so as to cause a corresponding further increase in the auxiliary reservoir pressure, and as a result, the maintaining valve device is again operated to vent fluid from the brake cylinder, so that a graduated release of the brakes is effected.

If, prior to effecting a graduated release of the brakes, the pressure of the fluid in the maintaining reservoir becomes reduced to that in the auxiliary reservoir by reason of the flow of fluid from the maintaining reservoir to the brake cylinder in order to maintain brake cylinder pressure against leakage, then in making a graduated release of the brakes, upon movement of the triple valve device to release position, the auxiliary reservoir is supplied with fluid by flow of fluid from the brake pipe only. The build up of auxiliary reservoir pressure from the brake pipe causes the same operation of the maintaining valve portion to vent brake cylinder fluid to atmosphere, as when the auxiliary reservoir is recharged from the maintaining reservoir. Since the brake pipe pressure may be increased in steps as desired, the pressure in the auxiliary reservoir and chamber 21 of the maintaining valve portion increases correspondingly, so that a graduated release of fluid from the brake cylinder is effected.

It will be noted that in releasing the brakes, since the maintaining valve portion operates to vent fluid from the brake cylinder only in proportion to the degree the auxiliary reservoir pressure is increased, full release of the brakes is prevented from occuring prior to the complete recharge of the auxiliary reservoir.

It will also be noted that the maintaining valve portion operates at all times, both in applying and releasing the brakes, to maintain a fixed ratio between the auxiliary reservoir pressure and the brake cylinder pressure.

As hereinbefore stated, in cycling with the usual brake equipment, the brake cylinder pressure is built up by the addition of pressure, due to successive applications, to the pressure retained in the brake cylinder, since the brakes are only partially released after each brake application. According to my invention, means are provided for securing a corresponding build up of brake cylinder pressure with a brake equipment of the maintaining type. In order to accomplish this result, the rotary valve 38 of the release change-over valve portion 5 is turned to cycling position, as shown in Fig. 1.

In cycling, with the release change-over valve portion in cycling position, the initial service application of the brakes results in obtaining the same brake cylinder pressure as with the release change-over valve portion in graduated release position.

If, after the initial service application, the brake pipe pressure is increased, the triple valve device is shifted to release position, in which fluid flows to the auxiliary reservoir 7 from the maintaining reservoir 8 and the brake pipe 13, so that the auxiliary reservoir pressure is increased and the maintaining valve portion is operated, as hereinbefore described, to vent fluid from the brake cylinder to a degree corresponding with the increase in auxiliary reservoir pressure. The flow of fluid from the brake cylinder to the atmosphere occurs through choked passage 98 in cavity 97 of the rotary valve 38 of the release change-over valve portion 5, and passage 99 being connected to cavity 97, fluid at brake cylinder pressure is supplied to the seat of slide valve 35, and the repeater valve piston 33 and slide valve 35 being in release position, as shown in the drawing, passage 99 is connected through cavity 100 in the slide valve 35 with passage 101 connected to a small reservoir 102, so that said reservoir is supplied with fluid from the brake cylinder. Fluid from the brake cylinder and the reservoir 102 then vents to the atmosphere through port 78 at a slow rate, so long as the pressure in the auxiliary reservoir continues to increase.

When the brake pipe pressure is again reduced to effect a second service application of the brakes, the triple valve device moves to service position, in which the connection from the brake cylinder to the atmosphere through the main slide valve 15 of the triple valve device is closed, and fluid from the brake pipe is vented to the quick service reservoir 9, thereby causing the repeater valve portion to operate so that cavity 103 in slide valve 35 connects passage 101 to passage 104, and fluid in reservoir 102 at the pressure retained in the brake cylinder during the previous release of the brakes, then equalizes into chamber 29 of the balancing portion 3 and acts on diaphragm 28. Said diaphragm is then moved and thereby the lever 31 is turned clockwise about the fulcrum 32. The lever 31 engages the diaphragm 19 of the maintaining valve portion 2 so that said diaphragm is subjected to a pressure proportional to the pressure acting on the diaphragm 28 and such that the upward pressure exerted through the lever 31 on diaphragm 19 balances the downward pressure of the fluid retained in the brake cylinder.

In effecting the second service application of the brakes, fluid under pressure is supplied to the brake cylinder and builds up the brake cylinder pressure over that retained in the brake cylinder during the previous gradual release, but when the brake cylinder pressure has been increased to the predetermined degree for which the maintaining valve portion is adjusted, if it were not for the action of the balancing portion, the maintaining valve portion would be operated by any increase in brake cylinder pressure over the predetermined ratio to vent fluid from the brake cylinder. This is prevented by the balancing portion, which, through the lever 31 exerts a pressure on the diaphragm 19 which corresponds with the pressure of fluid previously retained in the brake cylinder. As a result, the brake cylinder pressure is increased on the second service application so that the brake cylinder pressure equals the sum of the retained pressure plus the pressure corresponding with the ratio at which the maintaining valve portion is designed to operate.

As an example of the effect produced in the cycling operation, assuming that the diaphragms of the maintaining valve portion are so proportioned that for each pound decrease in pressure in the auxiliary reservoir, 2½ pounds pressure is produced in the brake cylinder, if a 10 pound reduction in brake pipe pressure is made, the corresponding reduction in auxiliary reservoir pressure produces a pressure of 25 pounds. If it be assumed that 10 pounds pressure has been retained in the brake cylinder, then the brake cylinder pressure will be 25 pounds, plus 10 pounds, or 35 pounds, instead of 25 pounds, when the balancing portion is not employed.

While the brakes remain applied in a service application of the brakes, the pressure of the lever 31 against the diaphragm 19 remains constant because the fluid in diaphragm chamber 29 and reservoir 102 is vented only when the valve device is moved to release position. If leakage from the brake cylinder should occur, the maintaining valve portion will operate to supply fluid to the brake cylinder so as to maintain the brake cylinder pressure at the higher degree which is provided in cycling.

It will be noted that the repeater valve portion operates with the triple valve device whenever it is shifted to service or release position, and consequently the functions of the repeater valve portion 4 might be taken care of by an arrangement of ports and passages controlled by the main slide valve 15 of the triple valve device.

Having now described my invention, what I claim as new and desire to secure by Letters Patent, is:—

1. In a fluid pressure brake, the combination with a brake cylinder, and auxiliary reservoir, of a valve device subject to the opposing pressures of the brake cylinder and the auxiliary reservoir for controlling the pressure in the brake cylinder, and means for opposing the brake cylinder pressure on said device by pressure retained in the brake cylinder.

2. In a fluid pressure brake, the combination with a brake cylinder and brake pipe, of a valve device subject to the opposing pressures of the brake cylinder and a pressure which varies with the brake pipe pressure for controlling the pressure in the brake cylinder, a chamber charged with fluid under pressure from the brake cylinder in releasing the brakes, and means for opposing the brake cylinder pressure on said valve device by the pressure in said chamber in applying the brakes.

3. In a fluid pressure brake, the combination with a brake cylinder and auxiliary reservoir, of a valve device subject to the opposing pressures of the brake cylinder and the auxiliary reservoir for controlling the pressure in the brake cylinder, a chamber, means for charging said chamber with fluid from the brake cylinder in releasing the brakes, and means for subjecting said valve device to the pressure in said chamber to oppose the brake cylinder pressure on said valve device.

4. In a fluid pressure brake, the combination with a brake cylinder and auxiliary reservoir, of a valve device subject to the opposing pressures of the brake cylinder and the auxiliary reservoirs for controlling the pressure in the brake cylinder, a chamber, means for charging said chamber with fluid from the brake cylinder in releasing the brakes, and means for subjecting said valve device to the pressure in said chamber to oppose the brake cylinder pressure on said valve device in applying the brakes.

5. In a fluid pressure brake, the combination with a brake cylinder, auxiliary reservoir, brake pipe, and triple valve device, of a maintaining valve device subject to the opposing pressures of the brake cylinder and a pressure which varies with the brake pipe pressure for controlling the pressure in the brake cylinder, means controlled by said triple valve device for charging a chamber from the brake cylinder in releasing the brakes, and for opposing the brake cylinder pressure on said maintaining valve device with the pressure in said chamber in applying the brakes.

6. In a fluid pressure brake, the combination with a brake cylinder and brake pipe, of a valve device subject to the opposing pressures of the brake cylinder and a pressure which varies with the brake pipe pressure for controlling the pressure in the brake cylinder, means for charging a chamber from the brake cylinder in releasing the brakes and for opposing the brake cylinder pressure on said valve device in applying the brakes with the pressure in said chamber, and a manually operable valve for controlling communication through which said chamber is charged from the brake cylinder.

7. In a fluid pressure brake, the combination with a brake cylinder and brake pipe, of a valve device subject to the opposing pressures of the brake cylinder and a pressure which varies with the brake pipe pressure for controlling the pressure in the brake cylinder, means for charging a chamber from the brake cylinder in releasing the brakes, means for opposing the brake cylinder pressure on said valve device by the pressure in said chamber in applying the brakes, and a valve device having one position for connecting said chamber to the brake cylinder and another position for connecting said chamber to said means for opposing the brake cylinder pressure.

8. In a fluid pressure brake, the combination with a brake cylinder and brake pipe, of a valve device subject to the opposing pressures of the brake cylinder and a pressure which varies with the brake pipe pressure for controlling the pressure in the brake cylinder, means for charging a chamber from the brake cylinder in releasing the brakes, means for opposing the brake cylinder pressure on said valve device by the pressure in said chamber in applying the brakes, a triple valve device, and a valve device controlled by said triple valve device and having one position for connecting said chamber to the brake cylinder and another position in which said chamber is connected to said means for opposing the brake cylinder pressure.

9. In a fluid pressure brake, the combination with a brake cylinder and brake pipe, of a valve device subject to the opposing pressures in the brake cylinder and a pressure which varies with the brake pipe pressure for controlling the pressure in the brake cylinder, means for charging a chamber from the brake cylinder in releasing the brakes, means for opposing the brake cylinder pressure on said valve device by the pressure in said chamber in applying the brakes, a triple valve device, and a valve device controlled by said triple valve device and having one position for connecting said chamber to the brake cylinder, and said means for opposing the brake cylinder pressure to the atmosphere, and another position in which said chamber is connected to said means for opposing the brake cylinder pressure.

In testimony whereof I have hereunto set my hand.

CLYDE C. FARMER.